US012136881B2

United States Patent
Simionescu et al.

(10) Patent No.: US 12,136,881 B2
(45) Date of Patent: Nov. 5, 2024

(54) MULTI-PHASE POWER CONVERTER WITH CURRENT MATCHING

(71) Applicant: Microchip Technology Incorporated, Chandler, AZ (US)

(72) Inventors: Bogdan Simionescu, Bucharest (RO); George Popescu, Bucharest (RO); Andrei Platon, Bucharest (RO); Teodor Toma, Bucharest (RO)

(73) Assignee: Microchip Technology Incorporated, Chandler, AZ (US)

( * ) Notice: Subject to any disclaimer, the term of this patent is extended or adjusted under 35 U.S.C. 154(b) by 83 days.

(21) Appl. No.: 18/140,896

(22) Filed: Apr. 28, 2023

(65) Prior Publication Data

US 2023/0353063 A1 Nov. 2, 2023

Related U.S. Application Data

(60) Provisional application No. 63/335,876, filed on Apr. 28, 2022.

(51) Int. Cl.
*H02M 3/158* (2006.01)
*H02M 1/00* (2007.01)
(Continued)

(52) U.S. Cl.
CPC ........ *H02M 3/1584* (2013.01); *H02M 1/0009* (2021.05); *H02M 1/143* (2013.01); *H02M 7/4803* (2021.05); *H02M 7/53873* (2013.01)

(58) Field of Classification Search
CPC .......................... H02M 3/1584; H02M 1/0009
See application file for complete search history.

(56) References Cited

U.S. PATENT DOCUMENTS

2003/0197245 A1\* 10/2003 Zhang ................ H02M 3/1584
257/532
2009/0152949 A1 6/2009 Adragna et al.
(Continued)

FOREIGN PATENT DOCUMENTS

EP 1 313 195 A2 5/2003

OTHER PUBLICATIONS

Search Report and Written Opinion of the International Searching Authority, European Patent Office, Jul. 18, 2023, International Application No. PCT/US2023/020376.

*Primary Examiner* — Jue Zhang
(74) *Attorney, Agent, or Firm* — Burr & Forman LLP; Ryan M. Corbett (57) ABSTRACT

A multi-phase power converter with current matching is provided. The apparatus may include a control circuit to control a first phase of a power converter having a plurality of phases, and a phase matching circuit. The phase matching circuit may remove a DC component from an output ripple voltage of the converter, detect when respective ones of the plurality of phases begins generating its respective phase current and output a phase detector signal, extract a signal proportional to the first phase current and a signal proportional to either the remaining or total phase currents, output first and second voltages respectively proportional to the average of the first phase current and the remaining or total phase current, and output a corrective signal based on the difference between the first and second voltage. The control circuit may control the first phase based on the corrective signal.

25 Claims, 9 Drawing Sheets

(51) Int. Cl.
*H02M 1/14* (2006.01)
*H02M 7/48* (2007.01)
*H02M 7/5387* (2007.01)

(56) References Cited

U.S. PATENT DOCUMENTS

| | | | |
|---|---|---|---|
| 2010/0013304 A1* | 1/2010 | Heineman | H02J 1/001 |
| | | | 307/31 |
| 2011/0148372 A1 | 6/2011 | Mariani et al. | |
| 2014/0312858 A1* | 10/2014 | Sreenivas | H02M 3/1588 |
| | | | 323/234 |
| 2015/0303808 A1* | 10/2015 | Ryotaro | H02M 3/1588 |
| | | | 323/271 |
| 2017/0368944 A1 | 12/2017 | Huang et al. | |
| 2018/0048232 A1 | 2/2018 | Adell et al. | |
| 2019/0058395 A1 | 2/2019 | Tayebi et al. | |
| 2019/0074770 A1* | 3/2019 | Trichy | H02M 3/1584 |

* cited by examiner

MULTI-PHASE POWER CONVERTER WITH CURRENT MATCHING

CROSS-REFERENCE TO RELATED APPLICATIONS

This application claims the benefit of U.S. Provisional Patent Application No. 63/335,876, filed on Apr. 28, 2022, which is incorporated herein by reference in its entirety.

TECHNICAL FIELD

The present disclosure generally relates to multi-phase power converters, and more specifically to current matching in multi-phase power converters using ripple analysis.

BACKGROUND

Multi-phase DC-DC converters have become widely used in high power or high current applications. While multi-phase buck converters have been widely used, in recent years multi-phase boost converters have started to become more common. However, multi-phase boost converters that use peak current mode regulation tend to self-mismatch because the detected peak current in the respective switches occurs when the output voltage is at a minimum.

Matching the phases of the respective output currents may address this problem, however some phase matching solutions are not power efficient, accurate and cheap, and often require measuring the individual phase currents and use a sharing analog bus prone to noise peaking. The measurement of the phase current is dissipative most of the time, or otherwise bulky and expensive. To avoid high power losses, the voltages involved in matching are very small, are often differential, and superimposed on a high common mode. To match the output current phases, the individual measurements are trimmed similarly, or use expensive low tolerance devices. Therefore, there is a need for a phase matching solution that may avoid the above drawbacks, and may not need phase measurement or tuning of individual converters, may be included inside the individual converter, may work without a sharing bus, may use the same path for all the relevant signals, may not rely on component accuracy, and/or may provide redundancy.

SUMMARY

According to an aspect of one or more examples, there is provided an apparatus that may include a control circuit to control a first phase of a power converter having a plurality of phases to output a plurality of respective phase currents, and a phase matching circuit to generate a corrective signal based on an output ripple voltage of the power converter. The phase matching circuit may include a DC removal circuit to receive the output ripple voltage, remove a DC component of the output ripple voltage, and output an AC component of the output ripple voltage, a differentiator circuit to determine a differential of the AC component of the output ripple voltage, a summing circuit to sum the differential of the AC component of the output ripple voltage and the AC component of the output ripple voltage and output a summed output voltage, a phase inception detector to detect, based on the summed output voltage, when each phase of the plurality of phases begins generating its respective phase current, and output a phase detector signal, a discriminator circuit to extract, based on the phase detector signal, a signal proportional to a first phase current of the plurality of respective phase currents, the first phase current generated by a first phase of the plurality of phases, and either remaining phase currents of the plurality of respective phase currents, the remaining phase currents generated by the plurality of phases other than the first phase, or the total phase currents of the plurality of respective phase currents, and an averaging filter to output a first voltage proportional to an average of the first phase current and output a second voltage proportional to an average current of the remaining phase currents. The discriminator circuit may include a first switch to couple the summed output voltage to the averaging filter based on the extracted signal proportional to the first phase current, and a second switch to couple the summed output voltage to the averaging filter based on the extracted signal proportional to the remaining phase currents. The phase matching circuit may also include an error amplifier to output the corrective signal based on a difference between the first voltage and the second voltage.

The phase inception detector may include a comparator to detect spikes of the summed output voltage and output the phase detector signal based on the detected spikes.

The phase matching circuit may also include a monostable circuit to output a phase identifier pulse based on the phase detector signal, wherein the discriminator circuit is to extract the signal proportional to the first phase current and the signal proportional to the remaining phase currents based on the phase identifier pulse.

According to an aspect of one or more examples, there is provided a phase matching circuit to generate a corrective signal based on an output ripple voltage of a power converter having a plurality of phases to output a plurality of respective phase currents. The phase matching circuit may include a DC removal circuit to receive the output ripple voltage, remove a DC component of the output ripple voltage, and output an AC component of the output ripple voltage, a differentiator circuit to determine a differential of the AC component of the output ripple voltage, a summing circuit to sum the differential of the AC component of the output ripple voltage and the AC component of the output ripple voltage and output a summed output voltage, a phase inception detector to detect, based on the summed output voltage, when the respective phases of the plurality of phases begins generating its respective phase current, and output a phase detector signal, a discriminator circuit to extract, based on the phase detector signal, a signal proportional to the first phase current of the plurality of respective phase currents, the first phase current generated by a first phase of the plurality of phases, and a signal proportional to the total phase currents of all of the plurality of respective phase currents, including the first phase current, and an averaging filter to output a first voltage proportional to an average of the first phase current and output a second voltage proportional to an average current of the total phase currents. The discriminator circuit may include a first switch to couple the summed output voltage to the averaging filter based on the extracted signal proportional to the first phase current, and a second switch to couple the summed output voltage to the averaging filter based on the extracted signal proportional to the total phase currents. The phase matching circuit may also include an error amplifier to output the corrective signal based on a difference between the first voltage and the second voltage.

According to another aspect of one or more examples, there is provided a phase matching circuit to generate a corrective signal based on an output ripple voltage of a power converter having a plurality of phases to output a plurality of respective phase currents. The phase matching circuit may include a DC removal circuit to receive the output ripple voltage, remove a DC component of the output ripple voltage, and output an AC component of the output ripple voltage, a phase inception detector to detect, based on the AC component of the output ripple voltage, when the respective phases of the plurality of phases begins generating its respective phase current, and output a phase detector signal, a discriminator circuit to extract, based on the phase detector signal, a signal proportional to the first phase current of the plurality of respective phase currents, the first phase current generated by a first phase of the plurality of phases, and a signal proportional to the remaining phase currents of the plurality of respective phase currents, the remaining phase currents generated by the plurality of phases other than the first phase, and an averaging filter to output a first voltage proportional to an average of the first phase current and output a second voltage proportional to an average current of the remaining phase currents. The discriminator circuit may include a first switch to couple the AC component of the output ripple voltage to the averaging filter based on the extracted signal proportional to the first phase current, and a second switch to couple the AC component of the output ripple voltage to the averaging filter based on the extracted signal proportional to the remaining phase currents. The phase matching circuit may also include an error amplifier to output the corrective signal based on a difference between the first voltage and the second voltage.

According to yet another aspect of one or more examples, there is provided a phase matching circuit to generate a corrective signal based on an output ripple voltage of a power converter having a plurality of phases to output a plurality of respective phase currents. The phase matching circuit may include a DC removal circuit to receive the output ripple voltage, remove a DC component of the output ripple voltage, and output an AC component of the output ripple voltage, a phase inception detector to detect, based on the AC component of the output ripple voltage, when the respective phases of the plurality of phases begins generating its respective phase current, and output a phase detector signal, a discriminator circuit to extract, based on the phase detector signal, a signal proportional to the first phase current of the plurality of respective phase currents, the first phase current generated by a first phase of the plurality of phases, and a signal proportional to the total phase currents of all of the plurality of respective phase currents, including the first phase current, and an averaging filter to output a first voltage proportional to an average of the first phase current and output a second voltage proportional to an average current of the total phase currents. The discriminator circuit may include a first switch to couple the AC component of the output ripple voltage to the averaging filter based on the extracted signal proportional to the first phase current, and a second switch to couple the AC component of the output ripple voltage to the averaging filter based on the extracted signal proportional to the total phase currents. The phase matching circuit may also include an error amplifier to output the corrective signal based on a difference between the first voltage and the second voltage.

According to another aspect of one or more examples, there is provided a method that may include receiving an output ripple voltage of a power converter having a plurality of phases to output a plurality of respective phase currents, removing a DC component of the output ripple voltage, and outputting an AC component of the output ripple voltage, detecting when respective ones of the plurality of phases begins generating its respective phase current, and outputting a phase detector signal at least partially in response to the detection, extracting, based on the phase detector signal, a signal proportional to the first phase current of the plurality of respective phase currents, the first phase current generated by the first phase of the power converter, and a signal proportional to either (i) remaining phase currents of the plurality of respective phase currents, the remaining phase currents generated by the plurality of phases other than the first phase, or (ii) total phase currents of the plurality of respective phase currents, the total phase currents generated by all phases of the plurality of phases, outputting a first voltage proportional to an average of the first phase current and output a second voltage proportional to an average of the remaining phase currents or total phase currents, outputting a corrective signal based on a difference between the first voltage and the second voltage, and controlling a first phase of the power converter based on the corrective signal.

DETAILED DESCRIPTION OF VARIOUS EXAMPLES

Reference will now be made in detail to the following various examples, which are illustrated in the accompanying drawings, wherein like reference numerals refer to like elements throughout. The following examples may be embodied in various forms without being limited to the examples set forth herein.

Figure 1:
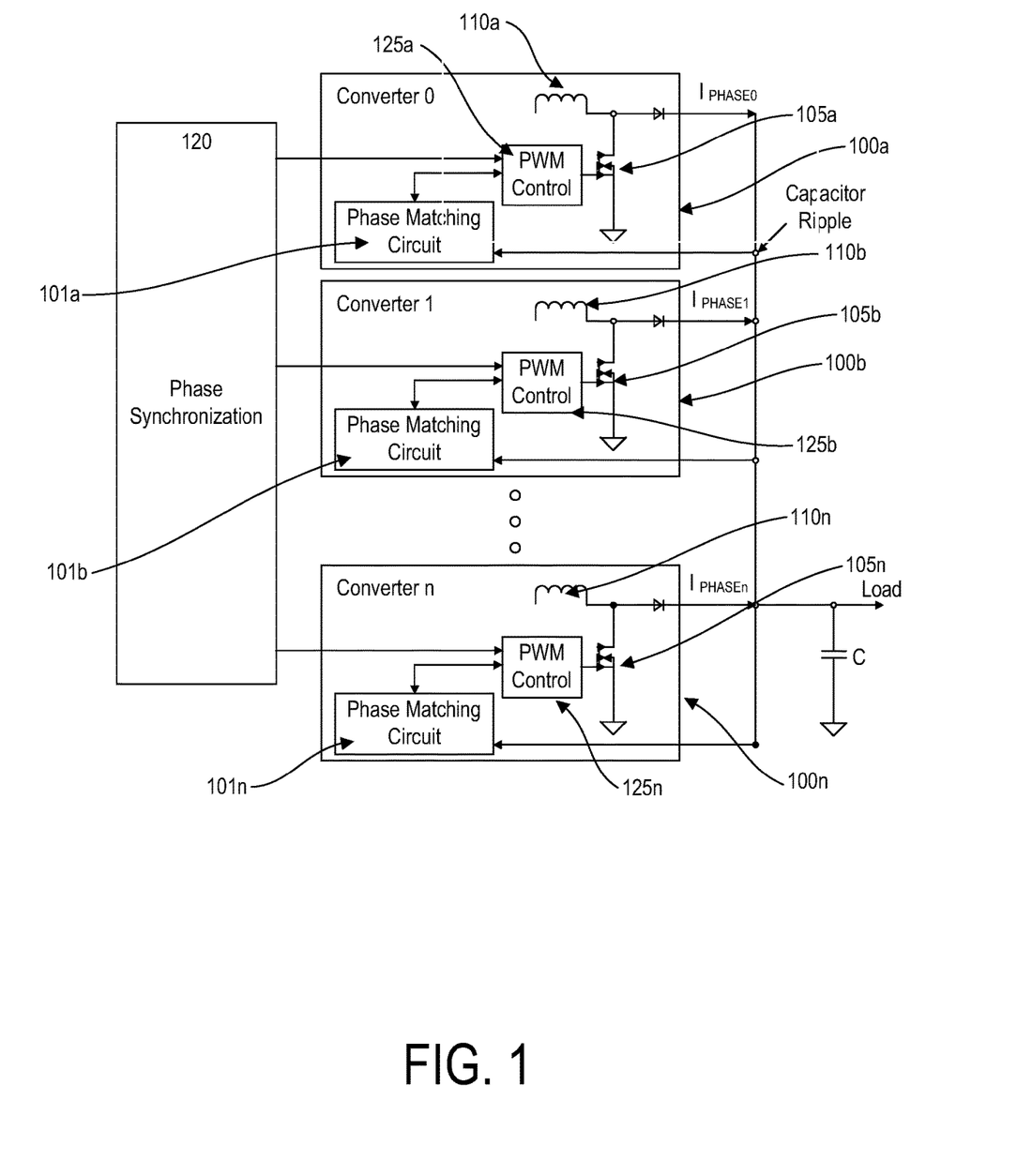
FIG. 1 is diagram of a multi-phase boost converter having individual phase matching circuits according to various examples.

Referring to FIG. 1, a multi-phase boost converter may include a phase synchronization circuit 120, which is coupled to and controls the timing of the output of a series of converters 0 to 'n' 100a, 100b, . . . 100n representing different phases, for example, by setting the duty cycle start moment for each of the converters. The individual converters 0 to 'n' 100a, 100b, . . . 100n may respectively include a modulation control circuit, which in this example is shown as a pulse width modulation (PWM) control circuit 125a, 125b, . . . 125n, coupled to a switch (shown in FIG. 1 as a FET), 105a, 105b, . . . 105n, which is coupled to an inductor 110a, 110b, . . . 110n to generate an output phase current, $I_{PHASE0}$, $I_{PHASE1}$, . . . . $I_{PHASEn}$. The individual converters may use the same frequency but different phases, splitting in time the output phase currents, $I_{PHASE0}$, $I_{PHASE1}$, . . . . $I_{PHASEn}$, which may be in the form of current pulses. The phase currents may be summed in one or more output capacitors C for delivery to a load.

FIG. 1 shows an example of a multi-phase boost converter, in which respective converters 0 to 'n' 100a, 100b, . . . 100n include a phase matching circuit 101a, 101b, . . . 101n to receive an output ripple voltage, determine a corrective signal based on the output ripple voltage, and use the corrective signal to modify the output phase current to match the other output phase currents of the other converters. While FIG. 1 shows a multi-phase boost converter in which the respective converters include a phase matching circuit, according to various examples, a phase matching circuit may not be included in the respective converters of the multi-phase boost converter. For example, the respective converters 100a-100n may output an output phase current to a phase matching circuit that may provide a corrective signal to the respective converters.

The produced output ripple voltage has two relevant components, an integral one due to the capacitance and a proportional one due to the equivalent series resistance (ESR) of the output capacitor C. A circuit that computes the sum of the output voltage AC component plus the differential of the AC component provides useful information regarding the pulsed output phase currents in the output capacitor C, and therefore on the sum of the output phase currents of the individual phases.

In the example shown in FIG. 1, the respective converters 100a, 100b, . . . 100n inside the multi-phase converters may analyze the common output ripple voltage and discriminate between the peaks generated by itself and the peaks produced by the other phases. Therefore, by computing the average of its own estimated current and the average of the other estimated currents, the respective phase converter can adjust its output so that all phases will be matched. This approach provides redundancy because, if one phase disappears, the other phases will still compare the current generated by itself with the average of the other currents and adjust itself to obtain a new matching output phase current based on the output phase currents of the remaining phases.

Figure 2:
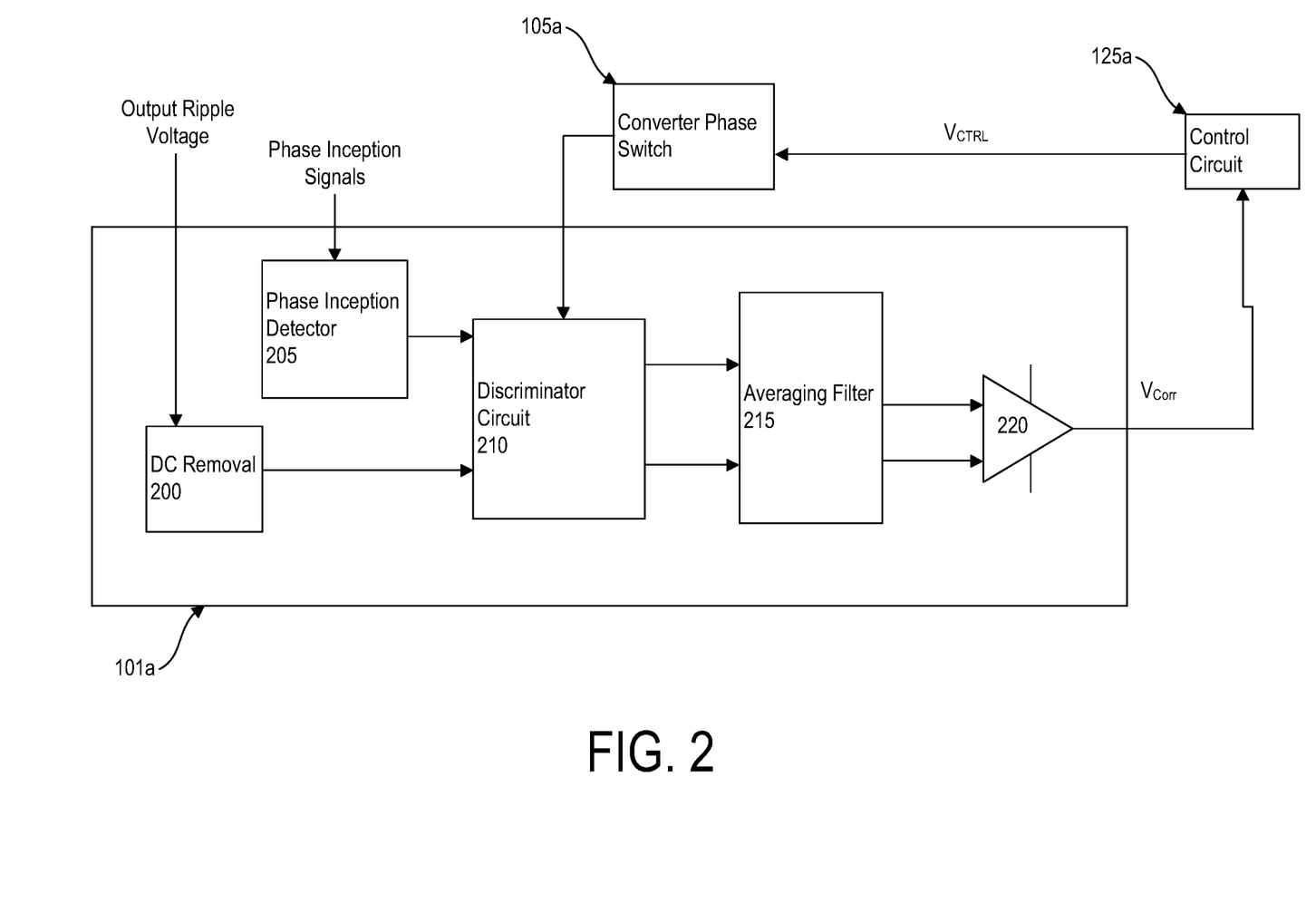
FIG. 2 is a diagram of a phase matching circuit and a control circuit of a multi-phase boost converter that detects inception of respective phases of the multi-phase boost converter based on one or more signals from the respective phases according to various examples.

FIG. 2 shows a phase matching circuit 101a and control circuit 125a of a multi-phase converter according to various examples. The phase matching circuit 101a may cause the output phase currents of the individual converters to match. The phase matching circuit 101a may include a DC removal circuit 200 to remove the DC component of the output ripple voltage on the output capacitor C (see FIG. 1), which is coupled in parallel to a load. After the DC component of the output voltage is removed, the remaining AC component is output to a discriminator circuit 210, described further below. The phase matching circuit 101a may also include a phase inception detector 205 that detects when the respective phases begin generating current in the output capacitor C, and outputs a phase detector signal at least partially in response to the detection. For example, the phase inception detector 205 may receive phase inception signals from the respective converters 100a-100n indicating when the respective converters began generating current in the output capacitor C. The discriminator circuit 210 may extract, based on the phase detector signal received from the phase inception detector 205 and the output of the DC removal circuit 200, a signal proportional to a first phase current of the plurality of respective phase currents generated by a first phase of the power converter (i.e., from converter phase switch 105a), and output the first phase current to averaging filter 215. The discriminator circuit 210 may also extract a signal proportional to the remaining phase currents of the plurality of respective phase currents (not including the first phase current) or the total phase currents (including the first phase current) and output the extracted signal proportional to the remaining or total phase currents to averaging filter 215.

The phase matching circuit 101a may also include an averaging filter 215 to receive the extracted signal proportional to first phase current from discriminator circuit 210, and the signal proportional to either the remaining phase currents (not including the first phase current) from discriminator circuit 210 or the total phase currents (including the first phase current). The averaging filter 215 may output a first voltage proportional to the average of the first phase current, and output a second voltage proportional to the average of the remaining phase currents or the total phase currents.

The phase matching circuit 101a may also include a phase error amplifier 220 to receive the first and second voltages output by the averaging filter 215. The phase error amplifier 220 may output a corrective signal $V_{CORR}$ based on the difference between the first and second voltages output by the averaging filter 215. The control circuit 125a may receive the corrective signal $V_{CORR}$ output by the phase error amplifier 220, and output a control signal VCTRL based at least partially on the corrective signal $V_{CORR}$ to control the first phase of the multi-phase converter. For example, the control signal VCTRL may be used to control the switch 105a of the first converter 100a.

Figure 3:
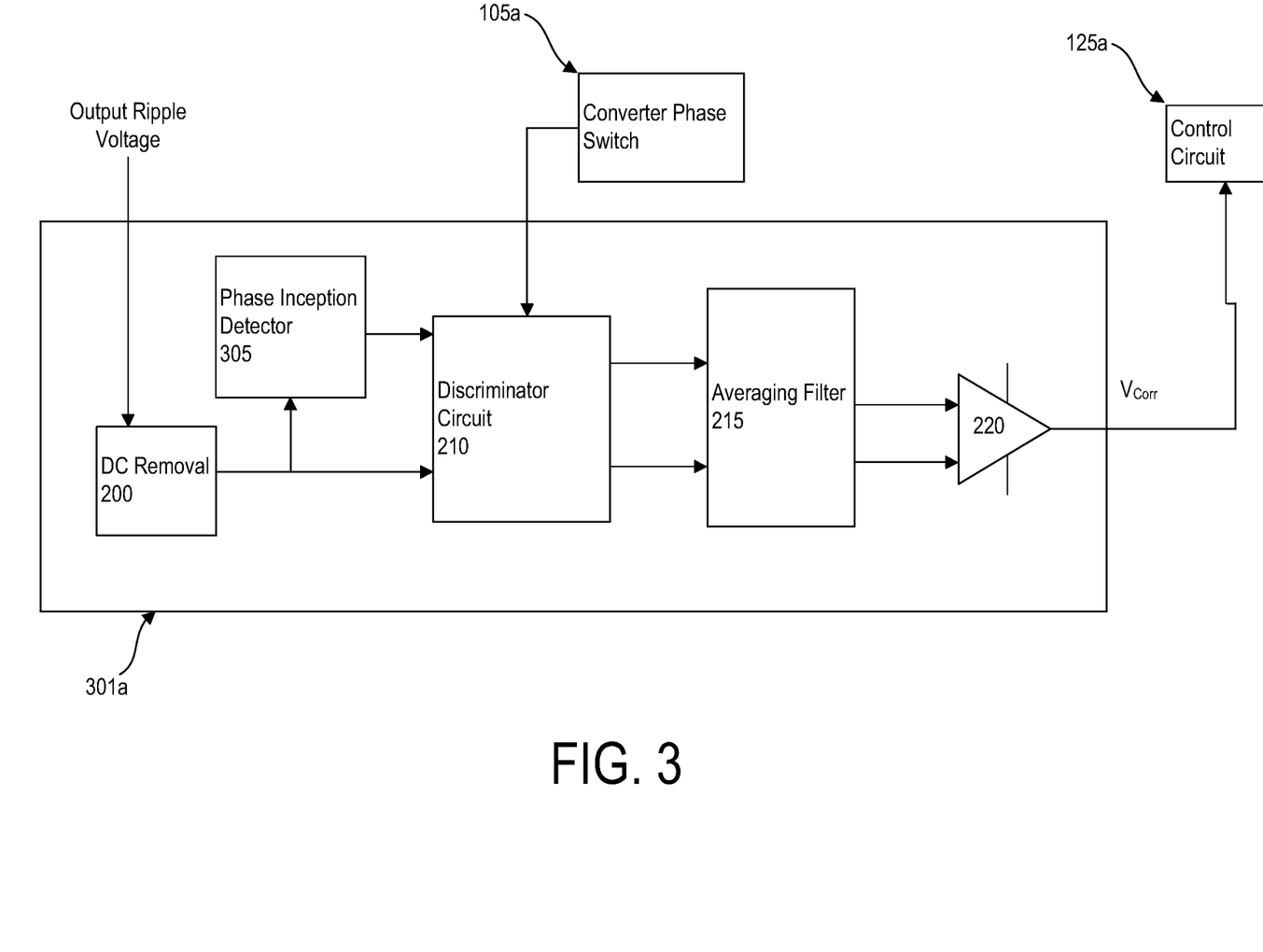
FIG. 3 is a diagram of a phase matching circuit and a control circuit of a multi-phase boost converter that detects inception of respective phases of the multi-phase boost converter based on the output ripple voltage according to various examples.

FIG. 3 shows a phase matching circuit 301a and control circuit 125a of a multi-phase converter according to various examples. The phase matching circuit 301a is similar to the phase matching circuit 101a of FIG. 2, except that the phase inception detector 305 shown in FIG. 3 receives the AC component of the output ripple voltage, which is output by the DC removal circuit 200. The phase inception detector 305 shown in FIG. 3 may detect when the respective phases begin generating current in the output capacitor C based on the output ripple voltage, and output a phase detector signal at least partially in response to the detection. For example, the phase inception detector 305 may detect when the respective phases begin generating current in the output capacitor C based on the AC component of the output ripple voltage that is output by the DC removal circuit 200.

Figure 4:
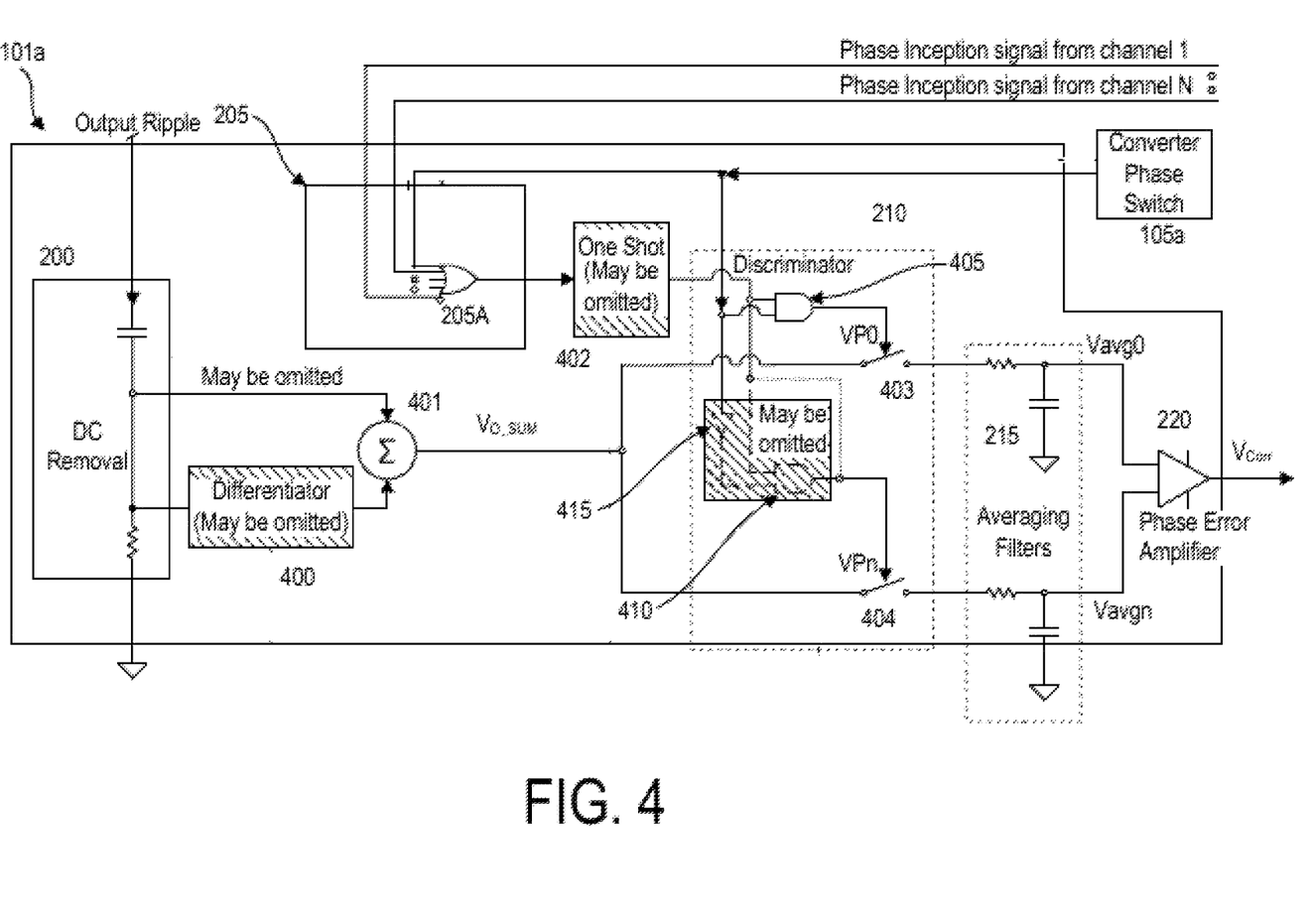
FIG. 4 is a diagram showing multiple variations of the phase matching circuit and control circuit of FIG. 2 that may use various representations of the output ripple voltage to generate a correction signal for the control circuit.

FIG. 4 shows multiple variations of the phase matching circuit 101a of FIG. 2 that may use various representations of the output ripple voltage to generate a correction signal for the control circuit. The phase matching circuit 101a may include a differentiator circuit 400 that may differentiate the AC component of the output ripple voltage that is output by the DC removal circuit 200. According to one or more examples, the differentiator circuit 400 may output the differential of the AC component of the output ripple voltage to the discriminator circuit 210. According to one or more examples, the phase matching circuit 101a may include a summing circuit 401 that sums the differential of the AC component of the output ripple voltage and the AC component of the output ripple voltage, to output an approximation of the summed output current as a summed output voltage $V_{O\_SUM}$ signal to the discriminator circuit 210. In some examples, only the differential of the AC component of the output ripple voltage may be used, or only the AC component of the output ripple voltage may be used, in which case summing circuit 401 may be omitted. In some examples, the approximation of the summed output voltage ($V_{O\_SUM}$) signal may be filtered in different ways.

The phase inception detector 205 may receive one or more phase inception signals from the respective individual phases, which are narrow, non-overlapping pulse signals indicating when the respective phase begins outputting its output phase current to charge the output capacitor C. For example, the phase inception detector 205 may receive gate drive pulse signals driving gate terminals of the respective switches 105a-105n, respective internal control logic pulse signals from the individual phases, voltage pulse signals from the drain terminals of the respective switches 105a-105n (though conversion from high voltage to low voltage may be used for this example), or any other pulse signals indicating when the respective phases begin outputting phase current to charge the output capacitor C. For example, in FIG. 4 any of these signals may be represented as "phase inception signals" from channels or phases 1 to N. The phase inception detector 205 outputs a phase detector signal based on the non-overlapping pulse signals received from the respective individual phases indicating when the respective phase begins outputting its output phase current. For example, the phase inception detector 205 may include an OR gate 205A to receive the phase inception signals, detect when individual phases begin outputting phase current based on the received phase inception signals, and output a phase detector signal. The phase detector signal may be received by the discriminator circuit 210, as described below.

According to various examples, the phase matching circuit 101a may include a monostable ("one shot") circuit 402 may be used in some examples to ensure a uniform length of the phase identifier signals. In these examples, the monostable circuit 402 may receive the phase detector signal from the phase inception detector 205 and output a phase identifier pulse based on the received phase detector signal.

The discriminator circuit 210 may receive the phase detector signal from the phase inception detector 205, or the phase identifier pulse from the monostable circuit 402, if applicable, and extract the pulse generated by a respective one of the individual converters 100a-100n with which phase matching circuit 101a is associated, in this example, the pulse of converter 0 100a, VP0. For example, the discriminator circuit 210 may include an AND gate 405 that receives the phase detector signal from the phase inception detector 205 (or the phase identifier pulse from the monostable circuit 402, if present), and the voltage at the drain of the switch (e.g., FET) 105a of the individual converter (in this example, converter 0 100a), or a pulse signal indicating when the output phase current of the respective individual converter with which phase matching circuit 101a is associated begins charging the output capacitor C, which may be in the form of various pulse signals, some examples of which are described above. For example, the converter phase switch of FIG. 4 may include a conditioner circuit 705 (see FIG. 7) that converts the voltage at the drain of the switch 105a of the individual converter 100a, or the signal indicating when the output phase current of the individual converter 100a with which phase matching circuit 101a is associated begins charging the output capacitor C, to a logic high or low state. On another path, the discriminator circuit 210 may extract a signal proportional to the pulses VPn generated by all of the other phases 100b-100n, not including phase 0 100a. In this example, the discriminator circuit 210 may include a second AND gate 410 that receives the phase detector signal from the phase inception detector 205 (or the phase identifier pulse from the monostable circuit 402, if present), and the inverse of the output phase current of the individual converter with which phase matching circuit 101a is associated (in this example, converter phase switch 105a of converter 0 (100a)) output by an inverter 415, or the signal indicating when the output phase current of the individual converter begins charging the output capacitor.

The discriminator circuit 210 may include a first switch 403 that connects the summed output voltage $V_{O\_SUM}$ signal to an averaging filter 215 when VP0 is active (i.e., when the phase current is initially applied to the output capacitor C), thus obtaining a voltage proportional to the average output phase current of phase 0 when VP0 is active (Vavg0). The voltage at the output capacitor C rises proportionally with the phase current flowing in the output capacitor C, and therefore the voltage proportional to the average output phase current of phase 0 can be obtained. The discriminator circuit 210 may include a second switch 404 that connects the summed output voltage $V_{O\_SUM}$ signal, to the same or to a similar averaging filter 215 when VPn is active, thus obtaining a voltage (Vavgn) proportional to the average output phase currents of the remaining phases (100b ... 100n) (not including phase 0), or of all phases (100a, 100b, ... 100n) (including phase 0), when VPn is active.

The phase error amplifier 220 may have suitable loop compensating gain, that compares Vavg0 to Vavgn and outputs a corrective signal, $V_{CORR}$, based on the comparison. The output of the phase error amplifier 220, the corrective signal named $V_{CORR}$, may be used to correct the output phase current of phase 0 in a suitable manner. For example, the corrective signal $V_{CORR}$ may modify the peak current value in a peak current mode converter, the loop voltage reference, the feedback voltage, any of the loop error amplifiers or any other circuit point that can change the output voltage or current of the individual converter 0 (100a). The corrective signal $V_{CORR}$ in a control point may act in one or both directions, for example only reducing the output current/voltage but not increasing it, or both reducing or increasing the current/voltage as required. The corrective signal $V_{CORR}$ may also affect one or several points of the circuit the same time.

Figure 5:
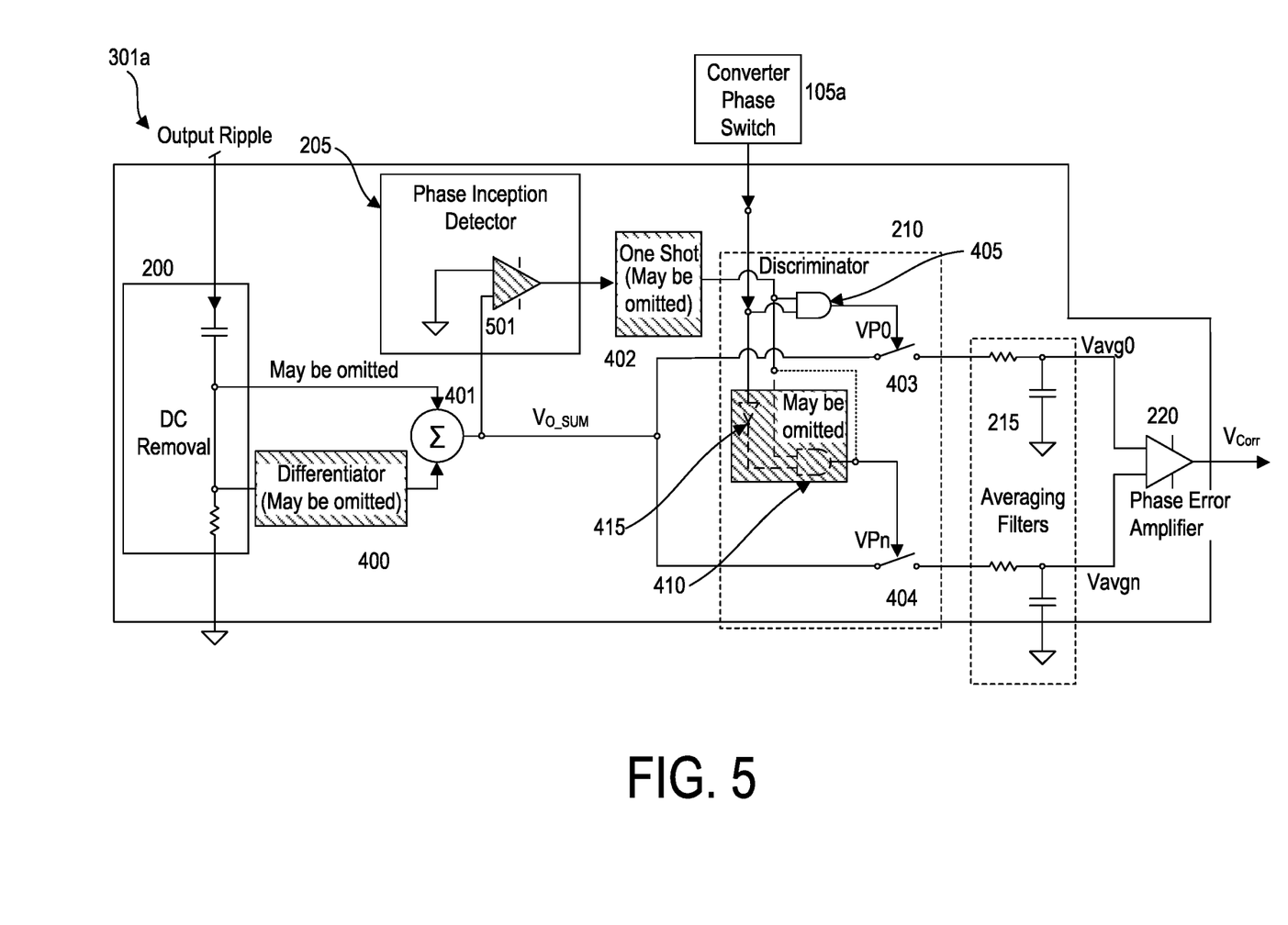
FIG. 5 is a diagram showing multiple variations of the phase matching circuit and control circuit of FIG. 3 that may use various representations of the output ripple voltage to detect inception of respective phases of the multi-phase boost converter and to generate a correction signal for the control circuit.

FIG. 5 shows multiple variations of the phase matching circuit 301a of FIG. 3 that may use various representations of the output ripple voltage to generate a correction signal for the control circuit. The phase matching circuit 301a may include the differentiator circuit 400 that may differentiate the AC component of the output ripple voltage that is output by the DC removal circuit 200. According to one or more examples, the differentiator circuit 400 may output the differential of the AC component of the output voltage to the phase inception detector 205 to (not shown in FIG. 5) detect when the respective phases begin generating current in the output capacitor C. According to one or more examples, the phase matching circuit 101a may include a summing circuit 401 that sums the differential of the AC component of the output ripple voltage and the AC component of the output voltage, to output an approximation of the summed output current as a summed output voltage $V_{O\_SUM}$ signal. In some examples, only the differential of the AC component of the output ripple voltage may be used, or only the AC component of the output ripple voltage may be used, in which case summing circuit 401 may not be required. In some examples, the approximation of the summed output voltage $V_{O\_SUM}$ signal may be filtered in different ways.

The phase inception detector 205 may include a comparator 501 that receives the summed output voltage $V_{O\_SUM}$ signal, detects spikes of the summed output voltage $V_{O\_SUM}$ signal that exceed a particular threshold, and outputs the phase detector signal. For example, one input terminal of the comparator 501 may receive the summed output voltage $V_{O\_SUM}$ signal, and the other terminal of the comparator 501 may receive a threshold voltage, such as zero volts, shown in FIG. 5. The comparator 501 may detect a spike of the summed output voltage $V_{O\_SUM}$ signal, which indicates when one of the respective phases begins generating current in the output capacitor C, when the summed output voltage $V_{O\_SUM}$ signal exceeds the threshold. According to one or more examples, instead of receiving the summed output voltage $V_{O\_SUM}$ signal the comparator 501 may receive the AC component of the output ripple voltage, or the differential of the AC component of the output ripple voltage, and detect the spikes thereof in the same manner. The comparator 501 outputs the phase detector signal to the discriminator circuit 210, or to the monostable circuit 402, if present. The remainder of the phase matching circuit 301a may include components similar to those described above in connection with FIG. 4 to generate the corrective signal named $V_{CORR}$ to correct the output phase current of phase 0.

Figure 6:
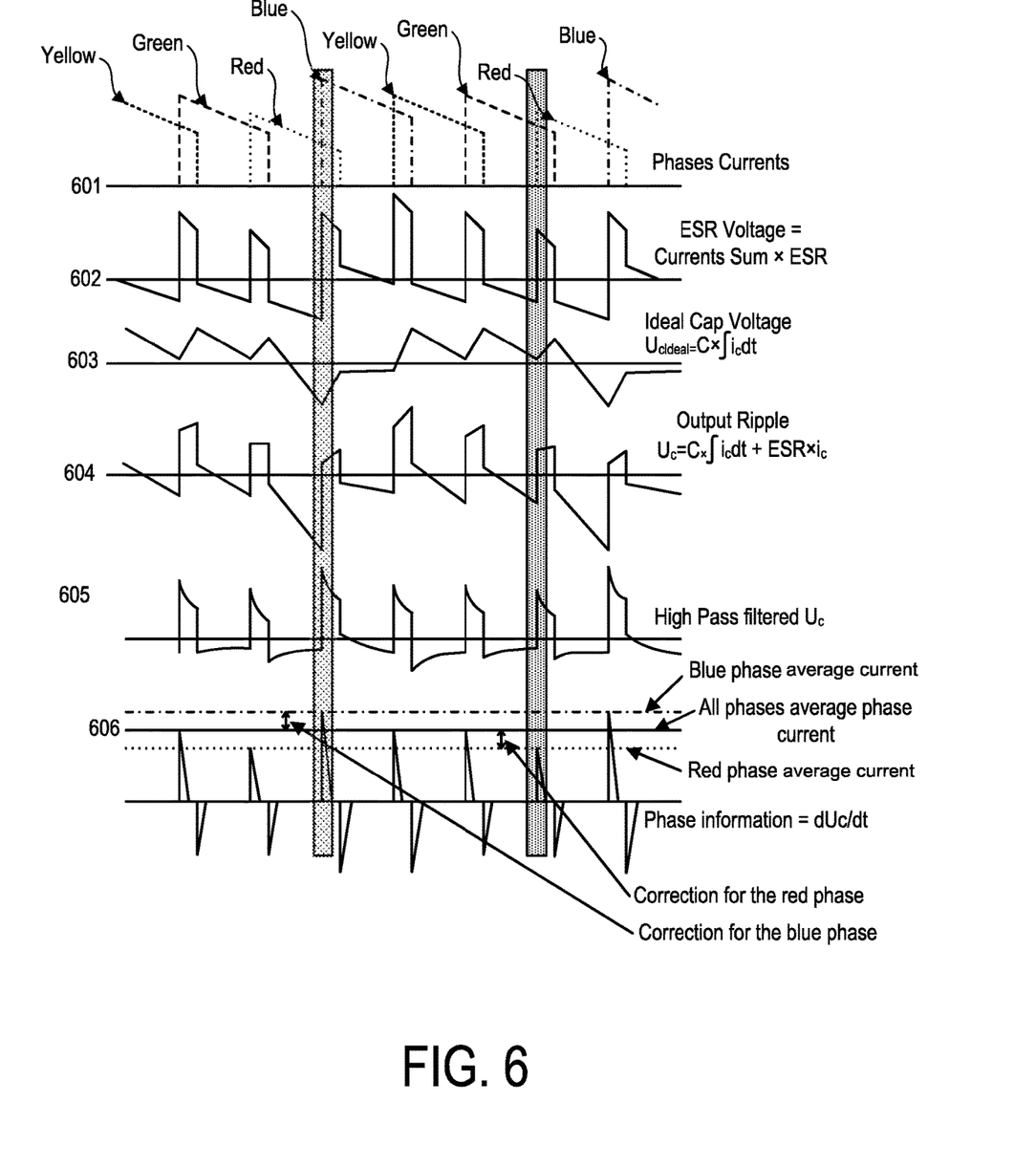
FIG. 6 is a waveform diagram showing multiple waveforms of signals of a phase matching circuit according to various examples.

FIG. 6 illustrates approximations of the example wave shapes in representative points in a four-phase circuit using a phase matching circuit according to various examples. The first waveform 601 in FIG. 6 shows four output phase currents (yellow, green, red, and blue) of four respective converters in a multi-phase boost converter. The second waveform 602 represents the ESR voltage, which is the sum of the output phase currents multiplied by the ESR. The third waveform 603 represents the ideal capacitor voltage, which is the integral of the current of the output capacitor C multiplied by its capacitance. The fourth waveform 604 represents the output ripple voltage at the output capacitor C. The fifth waveform 605 represents the output ripple voltage after the DC component has been removed by the DC removal circuit (200). Although the present description describes a DC removal circuit 200 that may remove the DC component of the output voltage and pass all frequencies of the AC component of the output voltage, the DC removal circuit 200 may instead by a high pass filter that may remove the DC component of the output voltage and some lower frequencies of the AC component of the output voltage. The bottom waveforms 606 of FIG. 6 show the voltages respectively corresponding to the average first output phase current (indicated as blue) and average second output phase current (indicated as red), and the voltage corresponding to the average of all of the output phase currents. The difference between the voltage corresponding to the average blue (or red) output phase current of an individual converter and the voltage corresponding to the average of all of the output phase currents of all of the converters in the multi-phase converter represents the corrective signal $V_{CORR}$ output by the phase error amplifier 220.

Figure 7:
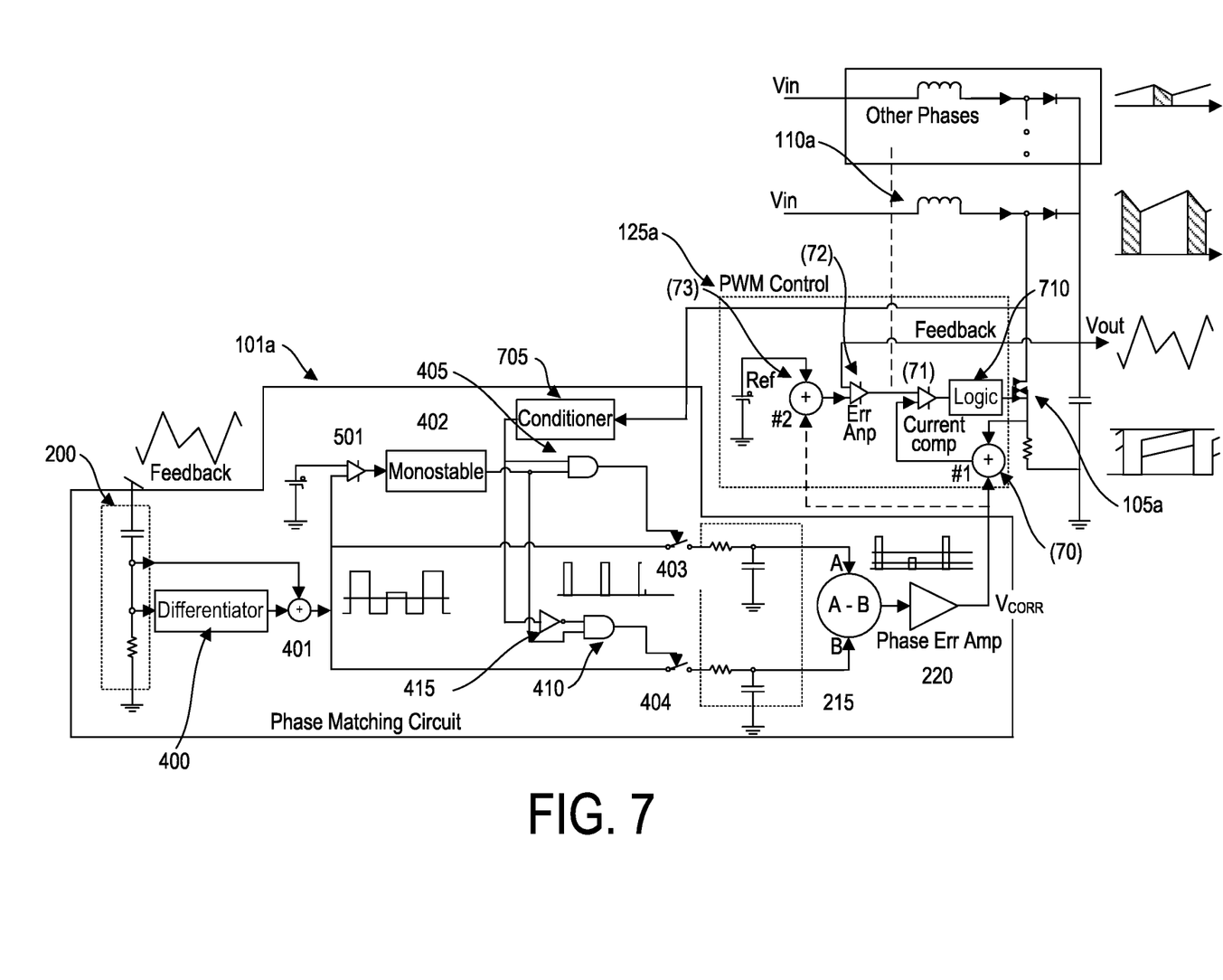
FIG. 7 is a diagram of a multi-phase boost converter according to various examples.

FIG. 7 is a diagram of a multi-phase boost converter according to various examples. As shown in FIG. 7, the multi-phase boost converter may include a phase matching circuit (101a) similar to the phase matching circuit shown in FIG. 4, wherein matching reference numerals are used to refer to the same components in FIGS. 4 and 7. The example shown in FIG. 7 corresponds to the example shown in FIG. 1, in which respective phases of the multi-phase converter includes a phase matching circuit 101a, 101b, . . . 101n.

Referring to FIG. 7, the phase error amplifier 220 outputs a corrective signal $V_{CORR}$, which may be summed by a summing circuit 70 with a shunt voltage from the source terminal of the FET of the converter phase acting as a switch (105a). In this example, the output of the summing circuit 70 is input to one input terminal of a current comparator 71. Alternatively, the shunt voltage from the source terminal of the switch 105a may be input directly to the input terminal of the current comparator 71. The other input of the current comparator 71 receives the output of an error amplifier 72. Error amplifier 72 receives at one input terminal the output voltage $V_{OUT}$ of the multi-phase boost converter. In one example, the other input terminal of the error amplifier 72 may receive a reference voltage Ref. According to another example, the other input terminal of the error amplifier 72 may receive the output of a summing circuit 73, which may sum the reference voltage Ref and the corrective signal $V_{CORR}$ output from phase error amplifier 220. The output of the current comparator 71 is input to a logic circuit 710 that controls the switching of the switch 105a of the converter phase 100a in order to control the output phase current of the phase at least partially based on the corrective signal $V_{CORR}$. Although the above description provides examples of the PWM control circuit, one skilled in the art would understand that many different examples of a control circuit may be used to utilize the corrective signal to match output phase currents.

Figure 8:
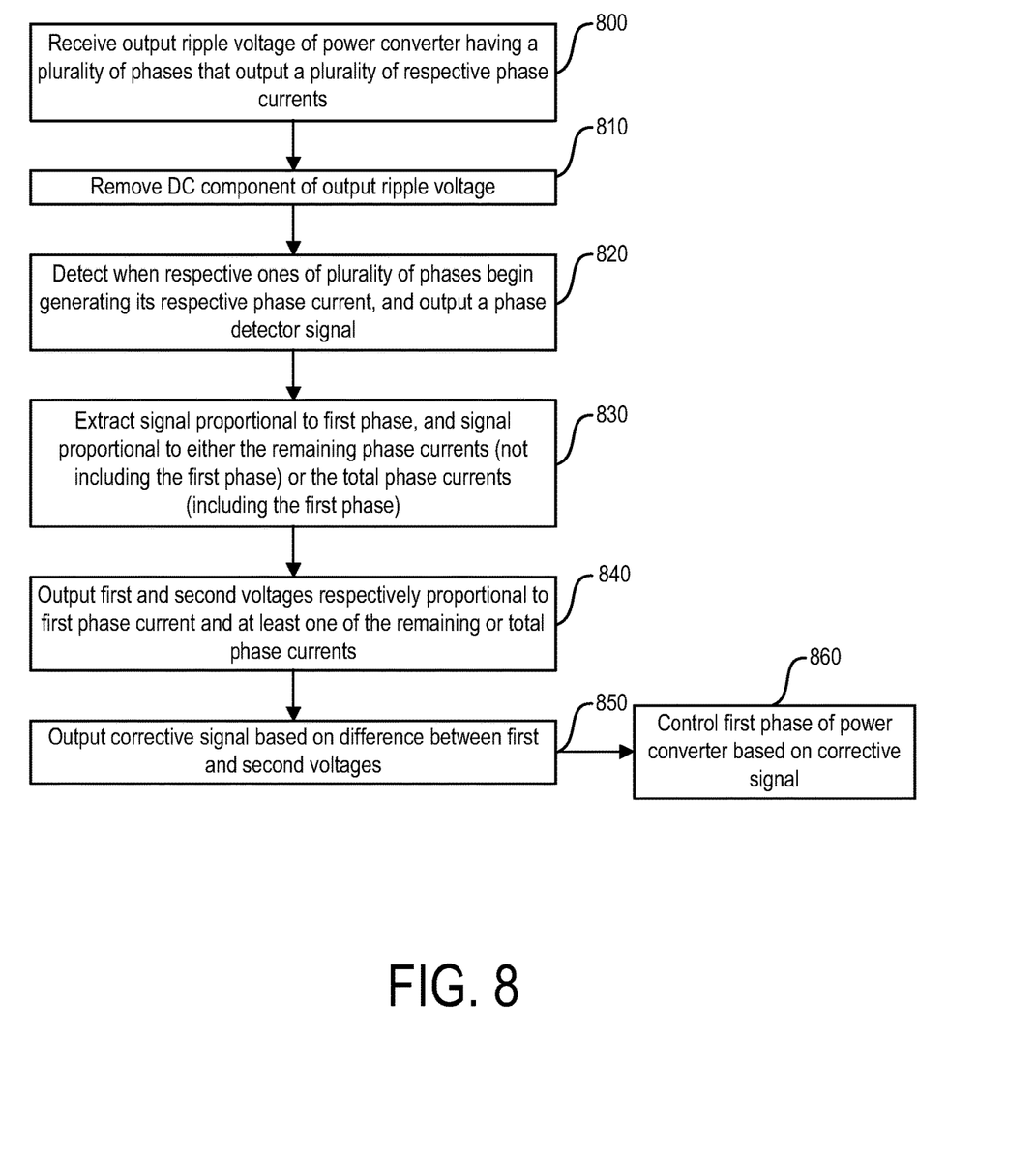
FIG. 8 is a flow chart showing a method of controlling a multi-phase power converter according to various examples.

FIG. 8 is a flow chart showing a method of controlling a multi-phase power converter according to various examples. The method shown in FIG. 8 may be performed by the examples of multi-phase boost converters and phase matching circuits described above. At step 800, the output ripple voltage of a power converter having a plurality of phases that output a plurality of respective phase currents may be received. At step 810, the DC component of the output ripple voltage may be removed. At step 820, it may be detected when respective ones of the plurality of phases begin generating its respective phase current, and a phase detector signal may be output. At step 830, a signal proportional to the first phase current generated by the first phase of the multi-phase converter may be extracted. At step 830, a signal proportional to the remaining phase currents (i.e. not including the first phase current) or the total phase current (i.e., including the first phase) may also be extracted. At step 840, a first voltage proportional to the first phase current may be output, and a second voltage proportional to remaining phase current or total phase current may be output. At step 850, a corrective signal based on the difference between the first and second voltages may be output. At step 860, the first phase of the multi-phase converter may be controlled based on the corrective signal.

Figure 9:
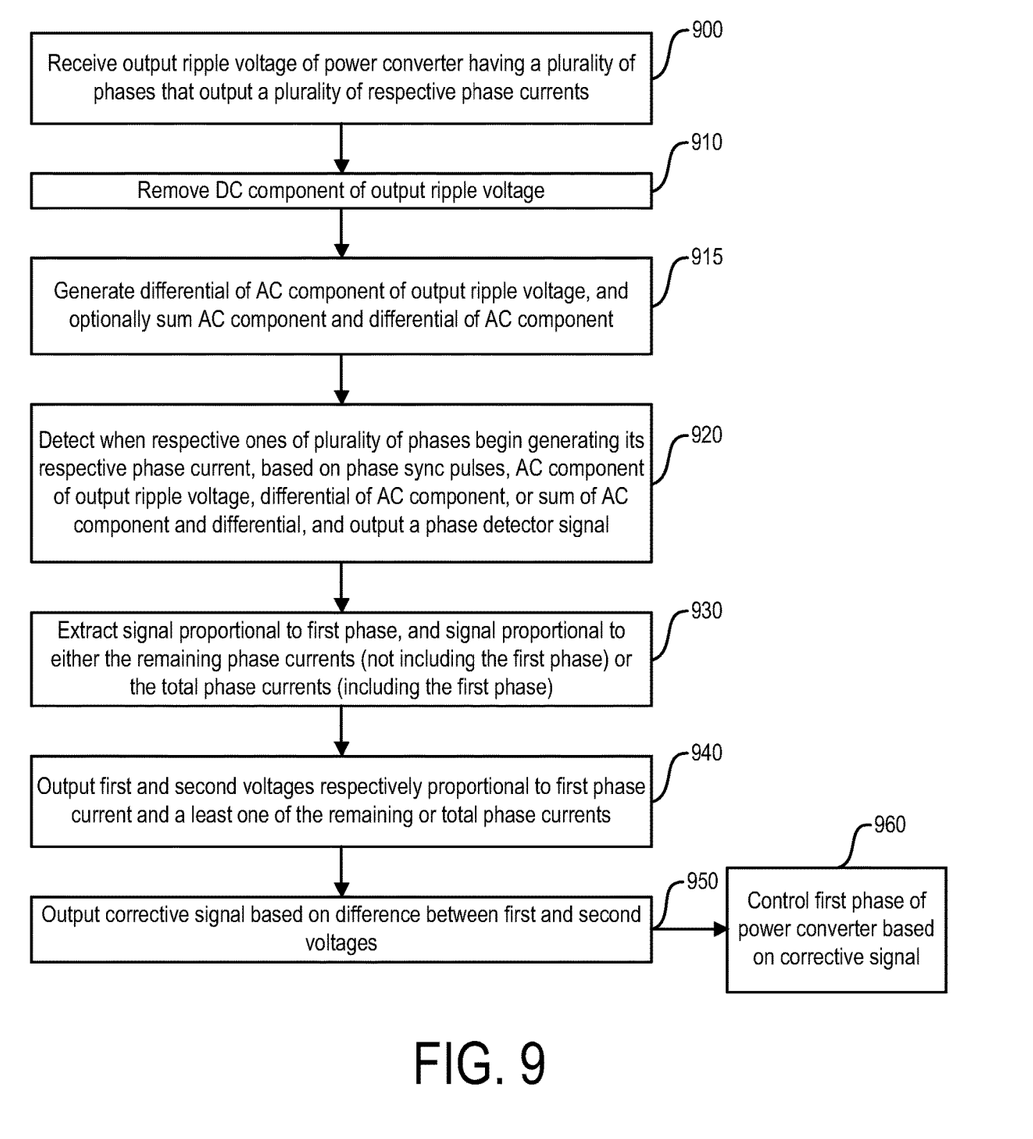
FIG. 9 is a flow chart showing a method of controlling a multi-phase power converter one or more representations of an output ripple voltage of the multi-phase converter.

FIG. 9 is a flow chart showing a method of controlling a multi-phase power converter one or more representations of an output ripple voltage of the multi-phase converter. The method shown in FIG. 9 may be performed by the examples of multi-phase boost converters and phase matching circuits described above. At step 900, the output ripple voltage of a power converter having a plurality of phases that output a plurality of respective phase currents may be received. At step 910, the DC component of the output ripple voltage may be removed. At step 915, the AC component of the output ripple voltage may be differentiated, and the differential may be summed with the AC component of the output ripple voltage. At step 920, it may be detected when respective ones of the plurality of phases begin generating its respective phase current, and a phase detector signal may be output. For example, the inception of respective ones of the respective phases may detected based on phase sync pulses from the respective phases, or based on the AC component of the output ripple voltage, the differential of the AC component of the output ripple voltage, or the sum of the AC component of the output ripple voltage and the differential of the AC component of the output ripple voltage. At step 930, the first phase current generated by the first phase of the multi-phase converter may be extracted. At step 930, one or more of the remaining phase currents (i.e. not including the first phase current) and the total phase current (i.e., including the first phase) may also be extracted. At step 940, a first voltage proportional to the first phase current may be output, and a second voltage proportional to remaining phase current or total phase current may be output. At step 950, a corrective signal based on the difference between the first and second voltages may be output. At step 960, the first phase of the multi-phase converter may be controlled based on the corrective signal.

Various examples have been disclosed herein, in connection with the above description and the drawings. It will be understood that it would be unduly repetitious to literally describe and illustrate every combination and subcombination of these examples. Accordingly, all examples can be combined in any way and/or combination, and the present specification, including the drawings, shall be construed to constitute a complete written description of all combinations and subcombinations of the examples described herein, and of the manner and process of making and using them, and shall support claims to any such combination or subcombination.

It will be appreciated by persons skilled in the art that the examples described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. An apparatus comprising:
   a control circuit to control a first phase of a power converter having a plurality of phases to output a plurality of respective phase currents; and
   a phase matching circuit comprising:
      a DC removal circuit to receive an output ripple voltage of the power converter, remove a DC component of the output ripple voltage, and output an AC component of the output ripple voltage;
      a phase inception detector to detect when respective ones of the plurality of phases begins generating its respective phase current, and output a phase detector signal at least partially in response to the detection;
      a discriminator circuit to extract, based on the phase detector signal, a signal proportional to a first phase current of the plurality of respective phase currents, the first phase current generated by the first phase of the power converter, and a signal proportional to either (i) remaining phase currents of the plurality of respective phase currents, the remaining phase currents generated by the plurality of phases other than the first phase, or (ii) total phase currents of the plurality of respective phase currents, the total phase currents generated by all phases of the plurality of phases; and
      an averaging filter to output a first voltage proportional to an average of the first phase current and output a second voltage proportional to an average of the remaining phase currents or the total phase currents; and
      an error amplifier to output a corrective signal based on a difference between the first voltage and the second voltage;
      wherein the control circuit is to receive the corrective signal and output a control signal based at least partially on the corrective signal to control the first phase of the power converter.

2. The apparatus of claim 1, wherein the discriminator circuit comprises a first switch to couple the AC component of the output ripple voltage to the averaging filter based on the extracted signal proportional to the first phase current, and a second switch to couple the AC component of the output ripple voltage to the averaging filter based on the extracted signal proportional to the remaining phase currents or total phase currents.

3. The apparatus of claim 1, wherein the phase inception detector comprises a comparator to detect spikes of the AC component of the output ripple voltage and output the phase detector signal at least partially based on the detected spikes.

4. The apparatus of claim 1, wherein the phase inception detector is to receive the respective phase currents from respective ones of the plurality of phases, and outputs the phase detector signal based on the respective phase currents from the plurality of phases.

5. The apparatus of claim 1, wherein the phase matching circuit comprises a monostable circuit to output a phase identifier pulse based on the phase detector signal; and
   wherein the discriminator circuit is to extract the signal proportional to the first phase current and the signal proportional to the remaining phase currents or total phase currents based on the phase identifier pulse.

6. The apparatus of claim 1, wherein the phase matching circuit comprises:
   a differentiator circuit to determine a differential of the AC component of the output ripple voltage; and
   wherein the discriminator circuit comprises a first switch to couple the differential of the AC component of the output ripple voltage to the averaging filter based on the extracted signal proportional to the first phase current, and a second switch to couple the differential of the AC component of the output ripple voltage to the averaging filter based on the extracted signal proportional to the remaining phase currents or total phase currents.

7. The apparatus of claim 1, wherein the current matching circuit comprises a differentiator circuit to determine a differential of the AC component of the output ripple voltage; and
   wherein the phase inception detector is to detect, at least partially based on the differential of the AC component of the output ripple voltage, when respective ones of the plurality of phases begins generating its respective phase current, and output the phase detector signal.

8. The apparatus of claim 7, wherein the phase inception detector comprises a comparator to detect spikes of the differential of the AC component of the output ripple voltage and output the phase detector signal at least partially based on the detected spikes.

9. The apparatus of claim 1, wherein the current matching circuit comprises a differentiator circuit to determine a differential of the AC component of the output ripple voltage; and
   wherein the phase inception detector is to receive the respective phase currents from respective ones of the plurality of phases, and output the phase detector signal based on the respective phase currents from the plurality of phases.

10. The apparatus of claim 1, wherein the current matching circuit comprises a differentiator circuit to determine a differential of the AC component of the output ripple voltage; and a monostable circuit to output a phase identifier pulse based on the phase detector signal, wherein the discriminator circuit is to extract the signal proportional to the first phase current and the signal proportional to the remaining phase currents or total phase currents based on the phase identifier pulse.

11. The apparatus of claim 1, wherein the current matching circuit comprises:

a differentiator circuit to determine a differential of the AC component of the output ripple voltage; and a summing circuit to sum the differential of the AC component of the output ripple voltage and the AC component of the output ripple voltage and output a summed output voltage;

wherein the discriminator circuit comprises a first switch to couple the summed output voltage to the averaging filter based on the extracted signal proportional to the first phase current, and a second switch to couple the summed output voltage to the averaging filter based on the extracted signal proportional to the remaining phase currents or total phase currents.

12. The apparatus of claim 1, wherein the current matching circuit comprises:

a differentiator circuit to determine a differential of the AC component of the output ripple voltage; and a summing circuit to sum the differential of the AC component of the output ripple voltage and the AC component of the output ripple voltage and output a summed output voltage;

wherein the phase inception detector is to detect, at least partially based on the summed output voltage, when respective ones of the plurality of phases begins generating its respective phase current, and output the phase detector signal.

13. The apparatus of claim 12, wherein the phase inception detector comprises a comparator to detect spikes of the summed output voltage and output the phase detector signal based on the detected spikes.

14. The apparatus of claim 1, wherein the current matching circuit comprises:

a differentiator circuit to determine a differential of the AC component of the output ripple voltage; and a summing circuit to sum the differential of the AC component of the output ripple voltage and the AC component of the output ripple voltage and output a summed output voltage;

wherein the phase inception detector is to receive the respective phase currents from respective ones of the plurality of phases, and output the phase detector signal based on the respective phase currents from the plurality of phases.

15. The apparatus of claim 1, wherein the current matching circuit comprises:

a differentiator circuit to determine a differential of the AC component of the output ripple voltage; and a summing circuit to sum the differential of the AC component of the output ripple voltage and the AC component of the output ripple voltage and output a summed output voltage; and a monostable circuit to output a phase identifier pulse based on the phase detector signal, wherein the discriminator circuit is to extract the signal proportional to the first phase current and the signal proportional to the remaining phase currents or total phase currents based on the phase identifier pulse.

16. A method comprising:

receiving an output ripple voltage of a power converter having a plurality of phases to output a plurality of respective phase currents;

removing a DC component of the output ripple voltage, and outputting an AC component of the output ripple voltage;

detecting when respective ones of the plurality of phases begins generating its respective phase current, and outputting a phase detector signal at least partially in response to the detection;

extracting, based on the phase detector signal, a signal proportional to the first phase current of the plurality of respective phase currents, the first phase current generated by the first phase of the power converter, and a signal proportional to either (i) remaining phase currents of the plurality of respective phase currents, the remaining phase currents generated by the plurality of phases other than the first phase, or (ii) total phase currents of the plurality of respective phase currents, the total phase currents generated by all phases of the plurality of phases;

outputting a first voltage proportional to an average of the first phase current and output a second voltage proportional to an average of the remaining phase currents or total phase currents;

outputting a corrective signal based on a difference between the first voltage and the second voltage; and controlling a first phase of the power converter based on the corrective signal.

17. The method of claim 16, comprising selectively generating the first voltage based on the AC component of the output ripple voltage and the extracted signal proportional to the first phase current, and selectively generating the second voltage based on the AC component of the output ripple voltage and the extracted signal proportional to the remaining phase currents or total phase currents.

18. The method of claim 16, wherein the detecting when respective ones of the plurality of phases begins generating its respective phase current comprises detecting spikes of the AC component of the output ripple voltage.

19. The method of claim 16, comprising receiving the respective phase current signals from respective ones of the plurality of phases;

wherein the detecting when respective ones of the plurality of phases begins generating its respective phase current is based on the received respective phase current signals.

20. The method of claim 16, comprising:

determining a differential of the AC component of the output ripple voltage;

selectively generating the first voltage based on the differential of the AC component of the output ripple voltage and the extracted signal proportional to the first phase current; and selectively generating the second voltage based on the differential of the AC component of the output ripple voltage and the extracted signal proportional to the remaining phase currents or total phase currents.

21. The method of claim 16, comprising:

determining a differential of the AC component of the output ripple voltage;

wherein the detecting when respective ones of the plurality of phases begins generating its respective phase current is based at least partially on the differential of the AC component of the output ripple voltage.

22. The method of claim 16, comprising:

determining a differential of the AC component of the output ripple voltage;

wherein the detecting when respective ones of the plurality of phases begins generating its respective phase current comprises detecting spikes of the differential of the AC component of the output ripple voltage.

23. The method of claim 16, comprising:

determining a differential of the AC component of the output ripple voltage;

determining a summed output voltage corresponding to a sum of the differential of the AC component of the output ripple voltage and the AC component of the output ripple voltage;

selectively generating the first voltage based on the summed output voltage and the extracted signal proportional to the first phase current; and selectively generating the second voltage based on the summed output voltage and the extracted signal proportional to the remaining phase currents or total phase currents.

24. The method of claim 16, comprising:

determining a differential of the AC component of the output ripple voltage;

determining a summed output voltage corresponding to a sum of the differential of the AC component of the output ripple voltage and the AC component of the output ripple voltage;

wherein the detecting when respective ones of the plurality of phases begins generating its respective phase current is based at least partially on the summed output voltage.

25. The method of claim 16, comprising:

determining a differential of the AC component of the output ripple voltage;

determining a summed output voltage corresponding to a sum of the differential of the AC component of the output ripple voltage and the AC component of the output ripple voltage;

wherein the detecting when respective ones of the plurality of phases begins generating its respective phase current comprises detecting spikes of the summed output voltage.

* * * * *